No. 760,319. Patented May 17, 1904.

UNITED STATES PATENT OFFICE.

CARL DREHER, OF FREIBURG, GERMANY.

PROCESS OF MAKING COMPOUNDS OF TITANIC AND LACTIC ACIDS.

SPECIFICATION forming part of Letters Patent No. 760,319, dated May 17, 1904.

Application filed November 18, 1901. Serial No. 82,702. (No specimens.)

*To all whom it may concern:*

Be it known that I, CARL DREHER, chemist and doctor of philosophy, a subject of the German Emperor, residing at 32 Zähringerstrasse, Freiburg, Germany, have invented a certain new and useful Process for the Manufacture of Faintly-Acid and Neutral Solutions and Salts, Respectively, of Titanic Acid and Lactic Acid, of which the following is a specification.

In the *Comptes Rendus Hebdomadaires des Séances de l'Académie des Sciences*, Vol. 16, it is stated that oxalic and tartaric acids act as solvents for titanic acid, which is stated to be easily dissolved thereby, and it is also stated that by dissolving titanic acid in alkali-bioxalates clear solutions are obtained which yield crystals consisting of alkali salts of titanic and oxalic acid, represented by the formula $2(C_2O_4HK),TiO_2$+water of crystallization. The specification of the British Patent No. 5712 of 1896 to Barnes mentions that titanic oxid precipitated from hydrochloric acid is soluble in hydrofluoric acid and also in tartaric and other organic acids, both by themselves and with or without the addition of fluorids, oxalates, or tartrates soluble in water. As a result of my experiments I have found that even freshly-precipitated titanic oxid—that is to say, $Ti(OH)_4$—which has undergone no change and which is very easily soluble in hydrochloric and oxalic acid if treated alone or with the addition of other salts of these acids is very sparingly soluble or practically insoluble in a number of other organic acids and even in the presence of water-soluble fluorates, oxalates, and tartrates, such as mentioned in British Patent No. 5712 of 1896 to Barnes, these salts having no influence upon the solution with a whole series of organic acids. Of these acids which dissolve titanic acid only with difficulty I may mention acetic acid, formic acid, and lactic acid. The dissolving properties of the acetic and formic acids upon titanic hydrate are not increased by the presence of salts of the same acids which are soluble in water—that is to say, of acetates and formiates. Thus in any case, even by the use of a great excess of concentrated acid, only very little titanic acid is dissolved. Lactic acid by itself dissolves titanic hydrate—that is to say, hydrated titanic acid, $Ti(OH)_4$—somewhat more readily, but only with a great excess of acid, even in case the titanic acid is freshly precipitated. Thus for dissolving twenty parts of titanic acid in a paste containing ten per cent. of titanic hydrate twenty parts of lactic acid of one-hundred-per-cent. strength are required. An addition of soluble fluorates, oxalates, or tartrates does not increase the solubility. In the presence of alkali salts or of salts formed by lactic acid with alkaline earths the solubility of titanic hydrate in lactic acid is increased. A clear solution and a complete dissolution of titanic acid by heating the aqueous solution of lactic acid and lactates is, however, only obtained when about double the molecular quantity of lactic acid and alkali lactate or of lactate of the alkaline earths is used that would be the molecular equivalent of the amount of oxalic acid effecting a clear solution of the amount of oxalic acid contained in the well-known double salts of oxalic acid with titanic acid mentioned above. Thus for effecting the perfect solution of two hundred and thirty-two parts of titanic hydrate in the form of paste seven hundred and fifty parts of lactic acid of fifty-per-cent. strength are required and another seven hundred and fifty parts of lactic acid neutralized by an alkali or carbonate of alkali, or for dissolving the same amount of titanic acid seven hundred and fifty parts of lactic acid of fifty per cent. and six hundred and fifty parts of crystallized calcium lactate are rquired, or the corresponding molecular quantity of lactate of barium, or lactate of strontium, or lactate of magnesium.

I have ascertained that the solution of titanic acid in lactic acid and in lactate of alkaline earths, respectively, may be effected by using an amount of lactic acid corresponding to the oxalic acid in the well-known double salts of oxalic acid instead of using oxalic acid, so that for one molecule of titanic acid two molecules of lactic acid and two molecules of lactate of alkali or of an alkaline earth are used, provided that lactic acid or its salts are made to act in very concentrated solutions upon freshly-precipitated titanic acid. For this purpose the paste of titanic acid is mixed with the necessary amount of lactic acid and of lactates so evaporated to a syrupy consistency or almost to dryness upon the water-bath, and after it has become greatly concentrated the heating is continued while the mass is constantly stirred. While dilute solutions were always turbid, by operating in the manner described a hygroscopic syrupy mass is obtained which yields a clear solution with water.

In order to carry out the process, freshly-precipitated titanic acid is pressed to free it from the bulk of its superfluous water. The paste thus obtained and containing, for instance, in two hundred and thirty-two parts of the paste eighty parts of titanic anhydride (TiO$_2$) is then mixed with, first, three hundred and sixty parts of fifty-per-cent. lactic acid, and three hundred and sixty parts of fifty-per-cent. lactic acid, which latter portion has been neutralized with an alkali or carbonate of an alkali, such as potassium hydrate, these proportions being used for the preparation of titanic-alkyl-lactate; second, for preparing a titanic lactate of an alkaline earth the paste is mixed with three hundred and sixty parts of fifty-per-cent. lactic acid in which have been dissolved at an increased temperature three hundred and eight parts of crystalline lactate of lime,

$(C_3H_5O_3)_2Ca + 5H_2O.$

The above-mentioned salts, which correspond to the formula

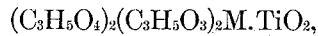
$(C_3H_5O_4)_2(C_3H_5O_3)_2M.TiO_2,$ can practically not be obtained by using titanic acid that has been kept for some time or which has been boiled by itself in aqueous solution or with titanic acid that has been dried. In the formula just mentioned M represents one molecule of a bivalent alkaline-earth metal or two molecules of a monavalent alkali metal. What has been said of the impossibility of obtaining those salts under certain condition is probably due to the fact that titanic hydrate Ti(OH)$_4$ is easily decomposed in forming hydrates (TiOH$_3$) containing less water which are insoluble in lactic acid. As regards this property of titanic hydrate of easily parting with its water compare *Lehrbuch der Anorganischen Chemie*, by Dr. F. Krafft, edition 1900, page 445. These titanic hydrates which have lost a part of their water still retain their ready solubility in stronger acids, such as hydrochloric, sulfuric, hydrofluoric, and oxalic acid.

While the direct preparation of clear solutions of titanic hydrate in lactic acid requires a great excess of lactic acid, if lactic acid alone is used, and even in the presence of lactates of alkalies or of the alkaline earths, unless the titanic acid has been freshly precipitated and the lactic acid and the lactates are made to act in a very concentrated solution upon freshly-precipitated titanic hydrate the same solutions of titanic acid in lactic acid may be obtained much more easily by proceeding in an indirect manner and without an excess of lactic acid and lactates, and even by employing titanic hydrate somewhat dehydrated or dried titanic hydrate, if the solution of titanic acid in other acids, such as sulfuric acid, oxalic acid, and hydrochloric acid, or the double salts of the corresponding acids are decomposed with such salts of lactic acid which form insoluble compounds with the acids mentioned—that is to say, by decomposing sulfuric-acid solutions of titanium with the molecular amount of alkaline-earth lactates, such as calcium lactate, barium lactate, required for the precipitation of the total amount of sulfuric acid in the form of sulfates or by employing the oxalic solutions of titanic acid and decomposing the same with such quantities of lactates of the earth metals and of lactates of some heavy metals, which form insoluble oxalates, such as lactate of copper, these quantites being sufficient for the precipitation of the oxalic acid, or I may employ hydrochloric-acid solution and lactate of lead. The same decomposition of the same titanium solutions with the corresponding acetates and formiates to form titanic acetate or titanic formiate cannot be accomplished, inasmuch as the greater part of the titanic acid precipitates, even in presence of an excess of acetic acid or formic acid, together with the insoluble sulfates or lactates, and only traces of titanic acid are obtained in solution.

The solutions of titanic acid in lactic acid obtained by my improved method can be evaporated without decomposition. They then form pasty or syrupy hygroscopic substances, which are readily soluble in water and alcohol.

*Example 1—Titanium-potassium lactate from titanium oxalate and calcium lactate.*—35.4 parts of crystallized potassium titanium oxalate $2(C_2C_4HK)TiO_2 + H_2O$ are dissolved in one hundred and fifty parts of water, and to this solution I then add a solution of sixty-two parts of crystallized lactate of lime in five hundred parts of water. The precipitated oxalate of lime is allowed to settle and then filtered. By decomposing the oxalate of lime with a mineral acid, such as hydrochloric or sulfuric acid, the oxalic acid may be easily recovered and may then be used for effecting the solution of new quantities of titanic acid.

*Example 2—Titanium lactate from titanium chlorid and lactate of lead.*—I may proceed by dissolving, for instance, one hundred parts of titanic hydrate dried at 50° centigrade and containing eighty parts of titanic anhydrid, (TiO$_2$,) so as to approximately correspond to the formula Ti(OH)$_3$, in three hundred and sixty-five parts of concentrated hydrochloric acid (forty-per-cent. acid, measured by volume) at an increased temperature, the clear hydrochloric-acid solution being then poured into the solution of three hundred and ninety parts of lactate of lead and fifteen hundred parts of water. I then allow it to settle and filter.

Instead of forming lactic-acid solutions of titanic acid by mutual decomposition and precipitation of the sulfuric, oxalic, or hydrochloric acid of the solutions of titanic acid in these acids, as hereinbefore described, it is also possible to obtain titanic-acid solutions in lactic acid by adding a lactate the basis of which does not precipitate the acid of the titanium oxid—thus, for instance, by adding to the hydrochloric-acid solution of titanium any lactate soluble in water, except lactate of lead, or in the case of sulfates and oxalates by adding an alkali salt of lactic acid, all these lactates being added in a quantity equivalent to the amount of acid—such as hydrochloric, sulfuric, or oxalic acid—combined with the titanic acid. The titanium lactate is immediately formed on heating the solution.

*Example 3—Titanium lactate from potassium titanium oxalate and lactate of soda.*—35.4 parts of crystallized potassium titanium oxalate in one hundred and fifty parts of water are added to the solution containing seventy-two parts of fifty-per-cent. lactic acid, which has been previously neutralized by sodium hydrate.

*Example 4—Titanium lactate from titanium chlorid and sodium lactate.*—The hydrochloric-acid solution of titanic acid which has been prepared in the manner described as an instance in Example 2 is added to seven hundred and twenty parts of lactic acid (of fifty per cent.) which has been previously neutralized by potassium hydrate, the mixture being then heated for a short time. Apart from the solution of titanic acid in lactic acid potassium chlorid is formed, which, however, does not interfere with the commercial application of the titanic lactate for the purpose of dyeing.

*Example 5—Titanium lactate from titanium chlorid and calcium lactate.*—The hydrochloric-acid solution of titanic acid obtained, for instance, as indicated in Example 2 is added to the solution of six hundred and twenty parts of calcium lactate dissolved in two thousand parts of water and then heated for a short time. Calcium chlorid, which is formed, besides titanium lactate, does not interfere with the commercial application of the titanium salts for dyeing purposes.

Instead of adding the solution of titanic acid in stronger acids to the solution of lactates I may of course also proceed by adding the solutions of titanic acid to lactic acid, and I then add the amount of alkali, carbonate of alkali, alkaline earth, or carbonate of alkaline earths corresponding to the amount of lactic acid employed. If the solution is heated, the decomposition will set in at once, and if alkaline earths and carbonates of the alkaline earths have been used these will be dissolved. If carbonates are used, carbonic acid will be set free, which does not interfere with the reaction. Other organic acids, such as salicylic or benzoic acid, will not dissolve titanic acid under the same circumstances. However, as regards solutions of titanic acids in acetic acid or formic acid, these cannot be obtained in a similar manner. The solutions of titanic acid in lactic acid obtained by the above-described methods still show a faintly-acid reaction. I have also found that all solutions of titanic acid in lactic acid, such as are obtained by the process above set forth, may be perfectly neutralized with alkalies, carbonates of alkalies, alkaline earths, or carbonates of the alkaline earths without any precipitation of titanic acid taking place.

All substances obtained by the above-mentioned method are combinations of one molecule of titanic acid and four molecules of lactic acid, readily soluble in water and also soluble in alcohol, but insoluble in ether, and represent white and very hygroscopic masses, which are preferably dried in a vacuum.

In case the solutions of titanic acid in stronger acids are transferred by salts of the lactic acid and without precipitation of the stronger acids (see Examples 3, 4, and 5) the compound of titanic acid and lactic acid is contaminated with neutral salts of the stronger acids, such as chlorids, sulfates, or oxalates of alkalies or chlorids of alkaline earth. In case an excess of lactic acid was used lactates of alkali or alkaline earth are accompanying the new compound of titanic acid with lactic acid. All these impurities, however, are of no consequence in the dyeing process for which the new titanium salts are to be employed. Now it is well known that titanic-acid solutions and titanium salts form very valuable mordants for dyes and that titanic acid yields deeply-colored lakes with mordant dyes. Inasmuch as titanic acid having slightly basic properties easily precipitates from its solutions, especially in the presence of mordant dyes, in which case lakes of such dyes are immediately formed, these solutions and salts are particularly adapted for the dyeing of fabrics which have to be dyed at a low temperature, such as leather, as described, for instance, in my application for patent, Serial No. 64,418, filed June 13, 1901, and relating to the dyeing of leather by means of titanium salts. A number of fabrics and materials, such as leather, which are considerably injured by dyeing them at a higher temperature, are also very sensitive to the action of acids, and it has been ascertained that vegetable-tanned leather, for instance, suffers already severely if treated with the hitherto-known solutions of titanic acid in oxalic or hydrochloric acid, not to speak of sulfuric and hydrofluoric acid, even if the leather has been treated with such acids in the cold and in very dilute solution—say one-per-cent. solution— and only for a short time—say half an hour. It was found that such leather possessed far less elasticity in the dressing operation than ordinary leather, and it was brittle and broke easily after it had been dried. If the leather is treated with the said titanium solutions at a higher temperature and without special auxiliary dyeing agents, such as are described in my application for patent, Serial No. 64,418, filed June 13, 1901, the leather is of course attacked considerably more. Lactic acid, however, injures leather much less and only if an excessive quantity of acid is allowed to act on the leather.

In order to prove at a glance how strongly leather is attacked by oxalic and hydrochloric acid when compared with the action of lactic acid, even if very dilute solutions are used, samples of vegetable-tanned leather were heated for a quarter of an hour to 40° centigrade with the molecularly-corresponding quantities of such an acid—for instance, with a solution of 1.26 parts of crystallized oxalic acid, or of 1.8 parts, by volume, of hydrochloric acid of forty per cent., (by volume,) or of 3.6 parts of fifty-per-cent. lactic acid in one hundred parts of water. The sample that had been treated with oxalic acid exhibited a shriveled appearance after one-quarter of an hour. The sample in hydrochloric acid was still more shriveled; but the sample in lactic acid, on the contrary, was scarcely changed. It is obvious, therefore, that faintly-acid and still less neutral salts of titanic acid and lactic acid do not injure leather, and, further, the solutions of titanic acid in lactic acid yield deeper shades than the solutions of titanic acid in oxalic acid and hydrofluoric acid, all the conditions of working remaining unchanged and the percentage of titanium remaining the same. These solutions in lactic acid may also be used for brushing leather accompanied by the alternate application of mordant dyes, as they do not injure leather even in concentrated solutions, while oxalates, fluorids, sulfates, and chlorides of titanium are not available at all for such purposes.

By the preparation of faintly-acid or neutral solutions of titanic acid in lactic acid without an excess of lactic acid, as hereinbefore described, very valuable new products of great value in the art of dyeing materials sensitive to acids (such as leather) are obtained.

What I claim is—

1. The process for obtaining a water-soluble and permanent compound composed of titanic and lactic acid in the proportion of one molecule of the former to four molecules of the latter, which consists in dissolving titanic acid in a strong acid, mixing the solution thus produced with a quantity of lactate sufficient to recover by means of the metal of the lactate the acid used for dissolving the titanic acid, then filtering and boiling down the filtrate, substantially as described.

2. The process for obtaining a water-soluble and permanent compound composed of titanic and lactic acid in the proportion of one molecule of the former to four molecules of the latter, which consists in dissolving titanic acid in hydrochloric acid, mixing the solution thus produced with a quantity of lactate sufficient to recover by means of the metal of the lactate the acid used for dissolving the titanic acid, then filtering and boiling down the filtrate, substantially as described.

3. As a new article of manufacture, a stable compound composed of titanic and lactic acid in the proportion of one molecule of the former to four molecules of the latter, the said compound being a hygroscopic mass soluble in water and in alcohol, but insoluble in ether and obtainable by the process described above.

In witness whereof I have hereunto set my hand in presence of two witnesses.

CARL DREHER.

Witnesses:
 HANS SCHIFFMANN,
 OTTMAR SCHÄTZLE.